2,727,496
INTERNAL COMBUSTION ENGINE OPERATION

Charles L. Thomas, Swarthmore, Pa., assignor to Sun Oil Company, Philadelphia, Pa., a corporation of New Jersey No Drawing. Application October 27, 1954,
Serial No. 465,150

4 Claims. (Cl. 123—1)

This invention relates to use of an internal combustion engine lubricant comprising a viscous mineral oil having charcoal dispersed therein, which lubricant is efficacious in lessening the accumulation of carbonaceous combustion chamber deposits in internal combustion engines.

Internal combustion engines, i. e. compression ignition engines as well as spark ignition engines, accumulate carbonaceous deposits in the combustion chambers thereof during the course of normal engine operation. Such deposits are deleterious in that they increase engine wear and in some cases promote engine knocking thereby causing higher octane fuel requirements. The carbonaceous deposits are derived largely from decomposition of the fuel and/or lubricant, although inorganic materials derived from the decomposition of various organo-metallic fuel or lubricant additives such as tetraethyl lead, iron carbonyl, and the like may also be contained in the deposits.

I have made the surprising discovery that accumulation of carbonaceous deposits in the combustion chambers of an internal combustion engine during operation of the engine can be lessened by operating the engine using as engine lubricant a viscous mineral oil having dispersed therein a minor amount of powdered charcoal.

It is not at this time definitely known by what mechanism this use of charcoal results in a reduction in the accumulation of combustion chamber deposits. It is theorized, however, that charcoal enters the combustion chamber dispersed in the mineral oil lubricant, and in the combustion chamber the charcoal is incorporated in carbonaceous material which deposits therein. Charcoal is more readily ignitable than the coke-like material resulting from hydrocarbon decomposition, and it is thought that the charcoal, once incorporated in the combustion chamber deposits, facilitates ignition and burning of these deposits with a net overall lessening of the quantities of such deposits. Whatever the mechanism, however, the fact remains that the use of charcoal dispersed in internal combustion engine lubricant results in decreased combustion chamber deposits as evidenced, for example, in automobiles by a decreased fuel anti-knock requirement.

The charcoal used according to this invention may be any commercially available charcoal which is readily combustible. Such charcoal is formed by heating wood or similar material out of contact with air as during the destructive distillation of wood. In general, the combustible charcoal used in this invention may be produced according to any of the procedures known to the art for producing charcoal. Prior to use in accordance with the invention, this charcoal is powdered, i. e. reduced to a fine state of subdivision, so that when added to viscous mineral oil the charcoal remains in intimate dispersion, e. g. colloidal dispersion, in the oil. Normally charcoal with particle sizes smaller than about 10 microns is suitable for use in this invention with use of the smaller particle sizes being preferred.

In carrying out the present invention, powdered charcoal is dispersed in minor amount in a viscous hydrocarbon lubricating oil. The lubricant may be any of the known viscous mineral oil internal combustion engine lubricants and it may contain any of the various additives such as extreme pressure agents, detergent additives, and the like which are known in the art. The amount of charcoal added to the oil should be less than that which gives grease-like consistency to the resulting lubricant. Normally, the addition of charcoal in amounts in the range of about 0.1% to 5% by weight of the total lubricant composition is suitable according to this invention, with amounts in the range of about 0.1% to 2% being preferred. However, under certain conditions it may be desirable to incorporate charcoal in the lubricant outside the above cited range.

This lubricant composition comprising charcoal dispersed in viscous mineral oil is then used according to this invention as an internal combustion engine lubricant. This lubricant is used in either an engine having relatively clean combustion chambers, or in an engine having substantial accumulation of carbonaceous deposits in the combustion chambers thereof. In the former case, the practice of the invention does not wholly prevent carbonaceous deposition, but the invention does result in a substantially lessened rate of deposit accumulation as well as in a lessened final level of deposit accumulation. In the latter case, i. e. application of the present invention to an engine having substantial quantities of previously accumulated carbonaceous deposits, practice of the invention results both in reduction of the quantity of such deposits and in maintenance of lessened amounts of deposit accumulation.

My invention is particularly useful when applied to spark ignition engines which operate on fuel containing an organo-metallic anti-knock agent such as tetraethyl lead or iron carbonyl or the like. Such organo-metallic additives decompose in the engine combustion chambers, and the decomposition products become incorporated in carbonaceous deposits already on the combustion chamber surfaces. These additive decomposition products promote pre-ignition and are otherwise deleterious when deposited in combustion chambers. Through practice of my invention, however, less of the additive decomposition products become incorporated in carbonaceous combustion deposits due to the lessened accumulation of such carbonaceous deposits. Accordingly, preignition and similar difficulties arising from the use of organo-metallic additives is reduced through practice of this invention.

It is to be noted that the present invention is distinct from prior art disclosures of the use of graphite in internal combustion engine lubricants. Graphite and charcoal do not have equivalent properties—e. g. graphite is difficult to ignite and burn as compared to charcoal. The use of graphite in a lubricant in place of charcoal in accordance with the process disclosed herein would tend to increase combustion chamber deposits due to the poor ignition and burning properties of graphite.

I claim:

1. The method of lessening the accumulation of carbonaceous deposits in the combustion chambers of an internal combustion engine which comprises: operating the engine using as engine lubricant a viscous mineral oil having dispersed therein powdered charcoal in minor amount.

2. The method according to claim 1 wherein said dispersed charcoal comprises 0.1% to 5% of the lubricant composition.

3. The method according to claim 1 wherein said dispersed charcoal comprises 0.1% to 2% of the lubricant composition.

4. The method according to claim 1 wherein said engine is a spark ignition internal combustion engine using fuel which contains an organo-metallic anti-knock additive.

No references cited.